Patented Mar. 12, 1946

2,396,556

UNITED STATES PATENT OFFICE 2,396,556

POLYVINYL ACETAL STABILIZATION

Fred W. Cox, Cuyahoga Falls, Ohio, assignor to Wingfoot Corporation, Akron, Ohio, a corporation of Delaware No Drawing. Application December 29, 1942, Serial No. 470,485

1 Claim. (Cl. 260—73)

This invention relates to the stabilization of polyvinyl acetal compositions. The acetals may, for example, be obtained by treating polyvinyl alcohol with an aldehyde. Generally, only partial conversion to the aldehyde is effected. For instance, the commercial polyvinyl butyral resin contains about 20 per cent of hydroxy and about 2 per cent acetate groups, the balance being polyvinyl butyral. Although the invention applies to other acetals, such as polyvinyl acetal and polyvinyl propional, it will be described more particularly in connection with the stabilization of polyvinyl butyral resin because this is the most common commercially.

The stabilizers of this invention are hexamethylene tetramine and salts thereof, such as the hydrochloride, citrate, acetate, sulfate, butyrate, succinate, oxalate, laurate, oleate, lactate, crotonate, benzoate, etc. When present in a small amount, one of these salts prevents or inhibits decomposition of the polyvinyl acetal resin when subjected to heat. In the absence of any stabilizer, the polyvinyl acetal resins decompose at elevated temperatures and discolor. The salts of hexamethylene tetramine prevent or retard such discoloration.

The stabilizer will usually be used in an amount equal to at least about 0.5 per cent of the polyvinyl acetal resin, and as much as 10 per cent or more may be employed. The stabilizer may be incorporated in the resin in any suitable manner. The use of the stabilizer is illustrated in the following example:

*Example*

Two cements—one containing 1 part of polyvinyl butyral resin in 4.6 parts by weight of alcohol and the other containing 1 part of polyvinyl butyral and 0.02 part of the tartrate of hexamethylene tetramine in 4.6 parts by weight of alcohol—were poured into glass molds, and the alcohol was allowed to evaporate. The resulting films were placed in an oven at 110° C. At the end of twenty-four hours the stabilized film was much less discolored than that to which nothing had been added.

What I claim is:

A composition of matter consisting of a polyvinyl butyral resin and the tartrate of hexamethylene tetramine as a stabilizer.

FRED W. COX.